(12) United States Patent
Lancaster et al.

(10) Patent No.: US 7,245,511 B2
(45) Date of Patent: Jul. 17, 2007

(54) RESISTOR DROPPER POWER SUPPLY WITH SURGE PROTECTION

(75) Inventors: Andrew Lancaster, Seneca, SC (US); Philippe Chiummiento, Seneca, SC (US); Sudhir Thumaty, Clemson, SC (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 11/210,258

(22) Filed: Aug. 23, 2005

(65) Prior Publication Data

US 2006/0044851 A1    Mar. 2, 2006

Related U.S. Application Data

(60) Provisional application No. 60/604,207, filed on Aug. 25, 2004.

(51) Int. Cl.
*H02H 7/125*    (2006.01)
(52) U.S. Cl. ......................... 363/53; 323/231
(58) Field of Classification Search ............... 323/231, 323/369; 361/18; 363/52, 53
See application file for complete search history.

(56) References Cited

U.S. PATENT DOCUMENTS

| | | | | |
|---|---|---|---|---|
| 3,911,324 A * | 10/1975 | Bishop | ......................... | 361/18 |
| 3,978,388 A * | 8/1976 | DE Vries | ..................... | 363/45 |
| 4,639,551 A * | 1/1987 | Kaire | ......................... | 323/231 |
| 5,023,747 A | 6/1991 | Lindsay | | |
| 5,050,060 A * | 9/1991 | Geuns | ......................... | 363/126 |
| 5,162,963 A * | 11/1992 | Washburn et al. | ............ | 361/18 |
| 5,457,621 A * | 10/1995 | Munday et al. | .......... | 363/21.16 |
| 5,548,462 A * | 8/1996 | Uchida et al. | ................. | 361/18 |
| 5,777,868 A * | 7/1998 | Gibboney, Jr. | .............. | 363/146 |
| 5,901,028 A | 5/1999 | Hamard | | |
| 5,930,130 A * | 7/1999 | Katyl et al. | ................... | 363/53 |
| 5,956,223 A | 9/1999 | Banting | | |
| 5,994,892 A | 11/1999 | Turino et al. | | |
| 6,229,295 B1 | 5/2001 | Hemminger et al. | | |
| 6,275,013 B1 * | 8/2001 | Higuchi | ...................... | 323/222 |
| 6,646,842 B2 * | 11/2003 | Pan et al. | ..................... | 361/58 |
| 6,744,612 B2 * | 6/2004 | Chen | .......................... | 361/58 |

OTHER PUBLICATIONS

International Search Report for PCT International Application No. PCT/US05/30089 dated Sep. 18, 2006.

* cited by examiner

*Primary Examiner*—Jeffrey Sterrett
(74) *Attorney, Agent, or Firm*—Dority & Manning, P.A.

(57) ABSTRACT

A power supply system and corresponding methodology is provided for providing a self-protected power supply for use with electronic electricity meters. The self-protecting features are provided, in part, through the use of surface mounted resistive components corresponding to a resistor dropper portion of the power supply. The use of surface mount components also provides a general reduction in circuit board surface area requirements thereby providing a compact overall construction and provides economies with respect to reduction in manufacturing process steps. When the surface mount resistor divider is configured along with a half-wave rectifier, a low voltage DC supply is obtained from a direct connection to a much higher voltage AC mains source without requiring the use of coupling capacitors or transformers. Plural output voltages may be provided and capacitive filtering may be associated with the outputs. The use of a surface mount resistor divider in combination with surge protection elements helps to distribute any power surge over the power supply, which facilitates the use of less robust surge protection devices to achieve desired levels of protection.

25 Claims, 2 Drawing Sheets

US 7,245,511 B2

RESISTOR DROPPER POWER SUPPLY WITH SURGE PROTECTION

PRIORITY CLAIM

This application claims the benefit of U.S. Provisional Application No. 60/604,207, entitled "RESISTOR DROPPER POWER SUPPLY WITH SURGE PROTECTION", filed Aug. 25, 2004, which is incorporated herein by reference for all purposes.

FIELD OF THE INVENTION

The present subject matter generally concerns a power supply system and methodology for supplying power to electronic meteorology within an electric meter and the protection of such power supplies from the effects of power surges.

BACKGROUND OF THE INVENTION

The successful integration of electronics based meteorology into electric metering devices yields many practical advantages. Non-exhaustive, non-limiting examples of such advantages include the ability to perform complex calculations; collect, store and transmit data; and perform automatic self testing operations as well as make electrical measurements in the same manner as previous non-electronic electric meters. Such advances in electric meter meteorology have come at a price, however in their implementation. For example, with the introduction of electronics to the meteorology mix and especially with the introduction of solid state electronics and, in particular, integrated circuit technology, power supplies (or in some instances, power sources, such as batteries) have been required to furnish operating power for the electronic components.

In addition to the power supply requirements for the electronic metrology components, it has been recognized that the electronic metrology components must operate in an often hostile environment. Therefore, various forms of protection from such hostile environment are desired. One common danger for such electronic metrology arises from the occurrence of surges on or along power lines to which the metrology electronics may be coupled.

One example of the general state of the art is U.S. Pat. No. 6,229,295 B1 by Hemminger et al. entitled "Apparatus For Metering At Least One Type Of Electrical Power Over A Predetermined Range Of Service Voltages" that issued May 8, 2001. A surge protection element is represented as coupled to the input of a power supply 20, and an additional element is provided as intended protection from lightning strike surges. Another example of the known art is found in Patent Application Publication U.S. 2002/0080545 A1 by Slater et al. entitled "Excessive Surge Protection Method And Apparatus," published Jun. 27, 2002. Yet another example of the known art is found in U.S. Pat. No. 5,901,028 by Hamard entitled "Electricity Meter Provided With A System For Protection Against Surges," issued May 4, 1999. Such '028 patent discloses varistors connected between each phase and neutral configured to dump any surge on a phase to neutral. U.S. Pat. No. 5,023,747 to Lindsay issued Jun. 11, 1991 and entitled "Meter Based Surge Suppression System" discloses an electricity meter with a surge suppression system mountable on a meter mounting panel. U.S. Pat. No. 5,956,223 to Banting issued Sep. 21, 1999 entitled "Surge Protection System Including Proper Operation Indication" discloses a meter extender surge suppression system that is designed to fit between a utility meter and a meter box to protect downstream equipment from power surges on the power line. U.S. Pat. No. 5,994,892 to Turino et al. issued Nov. 30, 1999 entitled "Integrated Circuit Design Automatic Meter Apparatus and Method" discloses an electronic electricity meter that includes the placement of metal oxide (MOV) surge suppressors as a portion of the power supply circuitry.

The disclosures of all of the foregoing United States patent documents are hereby fully incorporated into this application for all purposes by reference thereto. While various electronic metrology systems and power supply systems have been developed, no design has emerged that generally encompasses all of the desired characteristics as hereafter presented in accordance with the subject technology.

BRIEF SUMMARY OF THE INVENTION

In view of the recognized features encountered in the prior art and addressed by the present subject matter, an improved system and method for powering electronic systems integrated into and within electric meters has been developed. Surface mount technology is utilized to provide important aspects of a self-protected power supply while providing reduced circuit board real estate requirements as well as reducing certain previously required processing steps.

In accordance with more particular aspects of the disclosed technology, one aspect of the present subject matter is to provide a power supply for an electric meter comprised principally of surface mount technology components. Such electronic components require significantly less circuit board real estate than more conventional components and may, therefore contribute to a more compact overall design.

Another aspect of the related technology relates to a methodology for providing a self-protective feature to the power supply. By providing specialized configurations of components, surge energy applied to the power supply circuit can be dissipated, in major part, within the power supply circuit itself.

Various features and aspects of the subject self-protecting power supply offer a plurality of advantages. For example, the disclosed technology provides for a self-protected power supply that may be associated with plural voltage level sources. Capacitive filtering may be associated with the outputs. Another advantage of the present subject matter is that the manufacturing methodology used allows certain previously used production techniques to be avoided, thus reducing the overall production cycle time and complexity. When an exemplary surface mount resistor divider is configured along with a half wave rectifier, a low voltage DC supply is obtained from a direct connection to a much higher voltage AC mains source without requiring the use of coupling capacitors or transformers. Still further, the use of a surface mount resistor divider in combination with surge protection elements helps to distribute any power surge over the power supply, which facilitates the use of less robust surge protection devices to achieve desired levels of protection.

Additional aspects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

In one exemplary embodiment in accordance with present subject matter, a self-protected power supply may preferably include a resistor dropper portion, and a half-wave rectifier portion operatively associated with such resistor dropper portion, and may further includes a voltage clamp portion. In such an embodiment, the resistor dropper portion may further include n series connected groups of resistors, and n resistors connected in parallel within each of said groups of resistors, and with the number $n \geq 2$, all in accordance with present subject matter.

In additional optional aspects of such exemplary embodiment of present subject matter, such a self-protected power supply may further include a capacitor portion, coupled in parallel with the voltage clamp portion, and still further, a voltage regulator portion, having an input portion and an output portion with such input portion coupled to the capacitor portion.

In certain of the foregoing exemplary embodiments, an n number of resistors may be connected in parallel within each of the groups of resistors of the resistor dropper portion and may then be provided as surface mount resistors.

In still further aspects of such exemplary embodiments, in some instances each of the n resistors within each of the n series connected group of resistors may be provided with substantially the same resistive value.

In yet further present embodiments, a power supply system may be provided as a self-protected power supply for use with electronic electricity meters. In exemplary such present systems, a resistor dropper portion may comprise a plurality of surface mounted resistive components, with the resistor dropper portion having an input thereto associated with an AC mains which in turn is associated with an electronic electricity meter with which the power supply is used. Still further in such exemplary embodiments, additional aspects of such a combination may preferably include a half-wave rectifier portion operatively associated with the resistor dropper portion for providing a DC voltage output having a relatively lower voltage than the voltage of the associated AC mains. Also, a surge protection portion may be operatively interposed between the associated AC mains and the resistor dropper portion. With the foregoing various combinations, advantageously, any power surge is relatively distributed over the power supply system to achieve desired levels of protection for the associated electronic electricity meter while a relatively lower voltage DC supply is obtained from a direct connection to a much higher voltage AC mains source. All of such advantages are thereby provided without requiring the use of coupling capacitors or transformers. At the same time, the present subject matter also provides a general reduction in circuit board surface area requirements, thereby resulting in a relatively compact overall construction.

Exemplary embodiments and aspects of the present subject equally relate to and include corresponding methodology. For example, one present exemplary method relates to providing a self-protected power supply for use with electronic electricity meters. Such exemplary method may advantageously include steps of connecting a first predetermined number of surface mount resistors in parallel with a common input thereto, such method further associated with connecting a second predetermined number of surface mount resistors in parallel to a common output thereto, and connecting a half-wave rectifier in series between the first predetermined number of surface mount resistors and the second predetermined number of surface mount resistors. In accordance with such present methodology, a relatively higher AC voltage source associated with the common input to the first predetermined number of surface mount resistors may be reduced to a relatively lower voltage DC voltage for supplying the electronics of an electronic electricity meter associated with the self-directed power supply. In some of the foregoing embodiments, a further step may be practiced for selecting the number of the first predetermined number of surface mount resistors to be equal to the number of the second predetermined number of surface mount resistors. In other of the foregoing embodiments, a further step may be practiced of selecting the resistive value of the first predetermined number of surface mount resistors to be substantially the same resistive value as that of the second predetermined number of surface mount resistors.

Additional present exemplary methodology involves a method for providing a self-protected power supply for an electronic metrology device, involving the steps of providing a surge protective device configured for connection to a power mains supply with which the electronic metrology device is associated, connecting a self-protected power supply to such a surge protective device, and connecting a voltage regulator configured for connection to an associated electronic metrology device, the electronics of which is to be powered by the self-protected power supply while the electronic metrology device determines measurements based on the power mains supply. Further in accordance with certain embodiments of such methodology, the resistive values of the surface mount resistors may be selected in dependence on selected characteristics of the power mains supply and the electronic metrology device.

Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
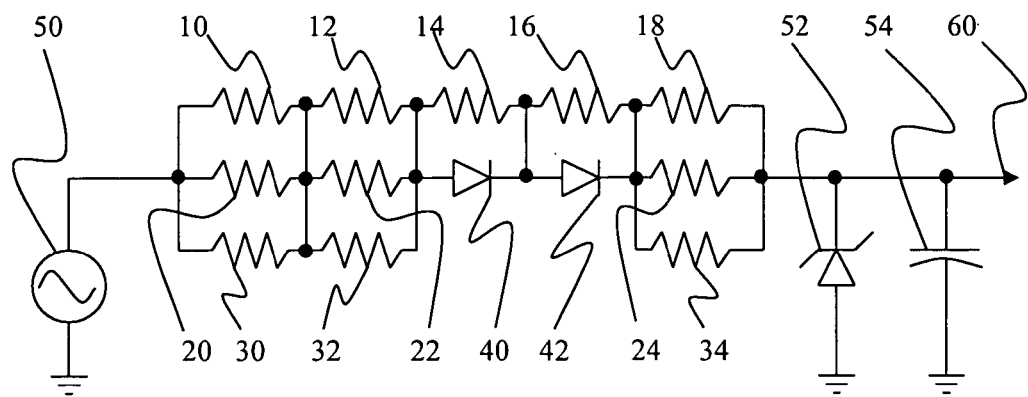
FIG. 1 is a schematic diagram illustration of an exemplary embodiment of a resistor dropper portion of a power supply in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Brief Summary of the Invention section, the present subject matter is particularly concerned with a self-protecting power supply system and methodology for powering electronic metrology systems associated with electric meters. In accordance with such present subject matter, the power supply may be implemented principally from surface mount components mounted on a printed circuit board. The power supply itself for example may include a plurality of resistors configured in series—parallel combinations coupled, along with a pair of rectifier diodes, to a Zener diode and parallel connected storage capacitor.

With specific reference to exemplary FIG. 1, the power supply, which may be denoted as a resistor dropper configuration, may in accordance with the present subject matter be directly connected to an AC mains 50. In an exemplary embodiment, AC mains 50 may correspond such as to a 240 Volts (V) alternating current (AC) source; however, such is not a limitation to the present subject matter as the various components of the power supply (as will be well understood by those of ordinary skill from the disclosure herewith) may be configured to allow operation at other alternative voltage source levels. Such alternative levels may be lower, e.g. at 110V AC, or higher as required by the source availability and the associate load and/or the metrology for which the power supply is to supply operating voltage.

As may be seen more particularly from exemplary FIG. 1, the resistor dropper power supply may make use of a plurality of respective resistors 10 through 34, configured in series—parallel combinations. Within the series—parallel combinations may exist for example three groups of three parallel connected resistors. In the exemplary embodiment illustrated, those groups would comprise resistors 10, 20, and 30, resistors 12, 22, and 32, and resistors 18, 24, and 34. Furthermore, in such exemplary configuration, each resistor would correspond to identically valued resistors.

In an exemplary configuration designed for use with a mains source 50 providing 240V AC, the individual resistors of the three groups of parallel-connected resistors may each correspond to 20 Kohm resistors. As should be apparent to those of ordinary skill in the art from the totality of the present disclosure, the series—parallel combination as illustrated in FIG. 1 of identically valued groups of resistors will collectively so configured provide an effective (i.e., equivalent) series resistance value equal to the common individual component value, i.e. an effective series resistance, in this exemplary case, of 20 Kohms.

It should also be readily apparent to those of ordinary skill in the art that other series—parallel combinations of resistors may be used in accordance with the present subject matter to effect similar resistive combinations. As non-limiting examples, two groups of two resistors, four groups of four resistors, or five groups of five resistors, as well as other configurations generally represented as "N"×"N" groups may be employed. A significant aspect to the selection of combinations is the amount of energy that can be dissipated from an energy surge coupled to the power supply, as will be discussed more fully below.

With further reference to FIG. 1, it will be seen that the resistor dropper power supply further includes a pair of diodes 40, 42 connected in series within the series—parallel configuration of the resistors. Connected in parallel with diodes 40, 42 are resistors 14, 16 that may be high value resistors and function as equalization resistors within the resistor dropper supply. In an exemplary configuration, resistors 14, 16 may each correspond to 1 Mohm resistors.

Finally, the resistor dropper portion of a power supply in accordance with the present subject matter includes a Zener diode 52 and parallel connected storage capacitor 54. Together, Zener diode 52 and capacitor 54 establish (i.e., set) and provide at terminal 60 an interim operating voltage value to be applied to the input of a voltage regulator portion of the power supply (discussed more fully with reference to FIG. 2). In the exemplary configuration illustrated in FIG. 1, Zener diode 52 may be selected for example to provide an interim power supply voltage of 22 volts.

As previously noted, the resistor dropper power supply of the present technology may be configured to operate at any of a number of input voltage levels (and at various output voltages, too). The above specific example illustrated an input voltage level of 240V AC that resulted in the selection of a 20 Kohm resistor value for use in the series—parallel combination circuit.

More generally in accordance with the present subject matter, the value chosen for the resistor element depends on the voltage value of the input voltage source and the current level required to operate the electronic metrology with which the supply is to be associated. In the case for example where the input source may be 110V AC, the resistor value may be selected to be 10 Kohms. A general formula for determining the current that should be available in accordance with the present subject matter to operate the electric meter metrology when used in an exemplary 240V AC mains voltage system is given by:

$$I_{average} = \frac{AVERAGE(V_{AC240Vrms} - (V_z + 2*V_{diode}))}{R_{dropper}}$$

where $V_{AC240Vrms}$ corresponds to the input source voltage, $V_{diode}$ is the voltage drop across the rectifier diodes 40, 42 and $R_{dropper}$ is the value of the individual resistor elements of the exemplary three groups of three resistors.

More generally, this later "value" (as taken from the individual resistor elements), may be as drawn from some other "N"×"N" combination as may be used in certain embodiments in accordance with the present subject matter. In the specific case illustrated above, an available current of 4.82 mA may be provided (as shown by the exemplary calculation hereinbelow).

$$I_{average} = \frac{V_{rms}*\sqrt{2} - \frac{(V_z + 2*V_{diode})*\pi}{2}}{\pi * R_{dopper}}$$

$$= \frac{240*\sqrt{2} - \frac{(22+1.2)*\pi}{2}}{\pi * 20 * 10^3}$$

$$= 4.82 \, mA$$

Figure 2:
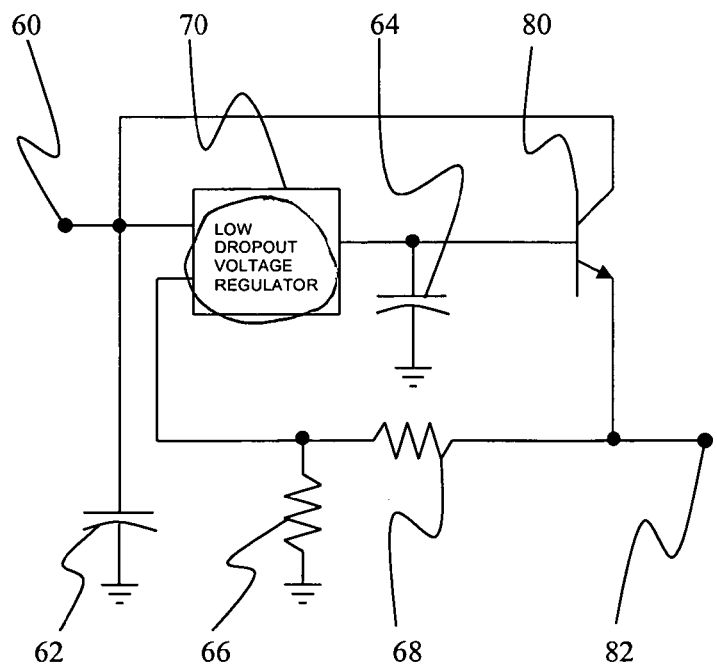
FIG. 2 is a schematic diagram illustration of an exemplary voltage regulator in accordance with the present subject matter for use, for example, with the FIG. 1 exemplary resistor dropper portion of the present power supply.

With respect now to FIG. 2, a schematic diagram of an exemplary voltage regulator for use with the present technology will be discussed. As previously discussed, the resistor dropper portion of the power supply in accordance with the present technology is configured to provide an interim output voltage that may in an exemplary configuration be set at about 22V DC to be applied to an input of an electronic voltage regulator. In an exemplary configuration the electronic voltage regulator may correspond to a low dropout voltage regulator (LDO) provided in the form of an integrated circuit device 70. In such an exemplary configuration, i.e., where the input to the voltage regulator 70 at terminal 60 is 22V DC, such voltage regulator 70, in conjunction with a mid power level output transistor 80, is configured to provide a continuous low level load that may correspond in such an exemplary embodiment to approximately 2 mA and, for short periods of time, a significantly higher load on the order of 350 mA for about 25 mS every few minutes.

With specific regard to the exemplary voltage regulator illustrated in FIG. 2, LDO 70 is supplied with an interim input voltage by way of terminal 60 from the resistor dropper portion of the power supply, and then in turn supplies a regulated output voltage at terminal 82 that may correspond to approximately 3.4V DC (based on the exemplary specific embodiment disclosed hereinabove). Such regulated output voltage is regulated to the desired level via the interrelationship of a pair of feedback resistors 66 and 68. At the same time, a pair of capacitors 62 and 64 provides transient voltage control for such regulated output voltage 82.

Figure 3:
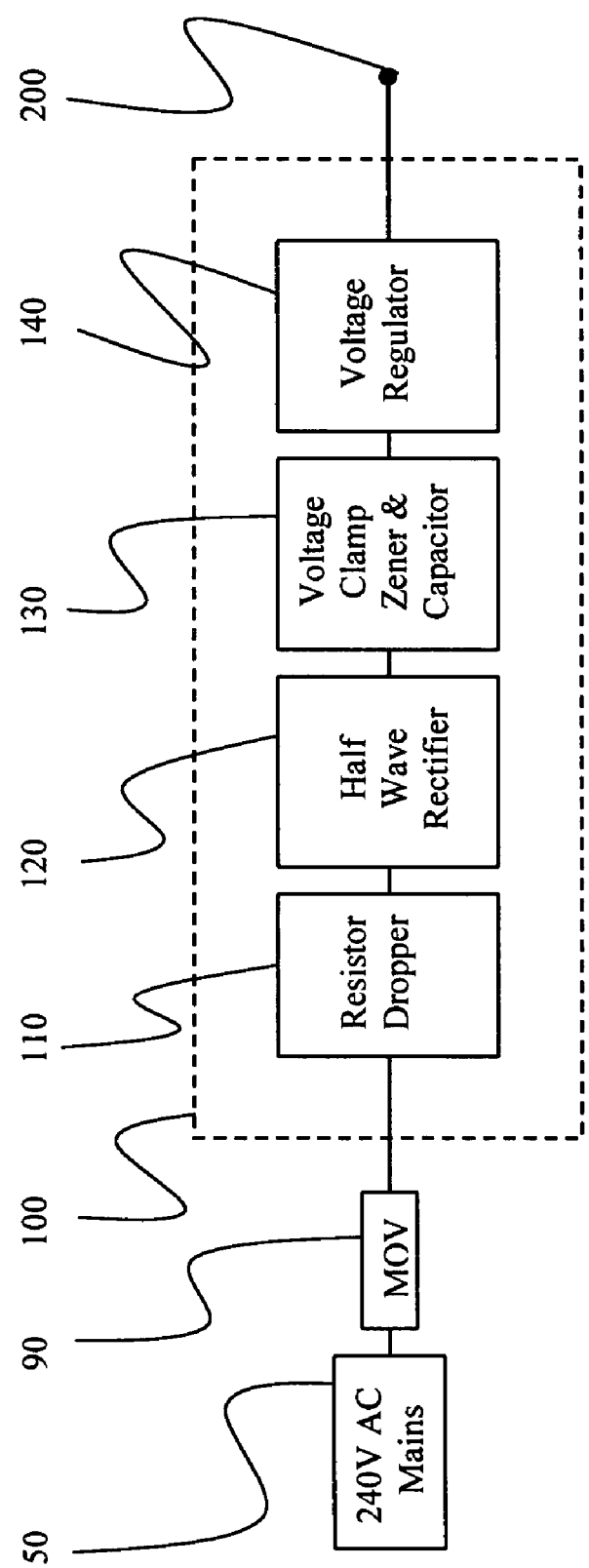
FIG. 3 is a block diagram illustrating an exemplary configuration of a self-protective power supply in accordance with the present subject matter.

With reference now to FIG. 3, the overall operation of the power supply of the present technology as well as yet another feature thereof (the self-protecting capabilities), will be discussed. As illustrated in exemplary FIG. 3, the power supply of the present technology may be viewed as a self-protecting supply in that the component portions of the supply are designed to safely endure (i.e., survive) surges that may typically be expected to occur in the operating environment of an electric meter with which the power supply may be associated.

In an exemplary embodiment of the power supply in accordance with the present technology, an electric meter metrology module and such associated power supply may be designed to withstand both fast transients and high voltage surges. In an exemplary configuration voltage surges up to about 6 KV may be accommodated. As illustrated in FIG. 3, the full protection is provided per the present subject matter through use of a board mounted power supply and an exemplary external metal oxide (MOV) transient suppressor 90 connected across the input voltage supply 50.

In an exemplary embodiment, the external MOV 90 may divert surges with surge levels above 1.5 KV up to about 6 KV. The exemplary on board power supply 100 is designed to sustain surges up to 1.5 KV for approximately 100 μS while always providing a DC regulated voltage of, in an exemplary configuration, about 3.4V DC. All the components mounted on the circuit board are surface mount components that reduces board space and removes the otherwise used through-hole process during manufacturing, thereby reducing cycle time.

The components that control the surge voltage are the dropper resistor portion (i.e., ladder) 110 corresponding to the three resistor groups 10, 20, 30; 12, 22, 32; and 18, 24, 34 (FIG. 1), the half wave rectifying diodes 40, 42 and the Zener diode 52.

During a positive portion of the output waveform from input source 50, both the diodes 40 and 42 of the half wave rectifier 120 are in conduction mode and a surge pulse may be absorbed by the resistor dropper portion 110 and the Zener diode within representative element 130 (which Zener diode is element 52 of FIG. 1), and as a result the rest of the circuit is protected. During a negative portion of the output waveform from input source 50, both diodes 40 and 42 of the half wave rectifier 120 are blocked and the surge pulse may be completely absorbed by the diodes 40, 42, and again the rest of the circuit is protected. During the positive portion of the surge, the maximum surge current that the resistor dropper portion (or ladder) 110 and the Zener 52 (part of element 130) have to withstand is calculated with the formula given below:

$$I_{\text{surge\_max}} \approx \frac{V_{surge}}{R_{ladder}} = \frac{1500 + 340}{20 * 10^3} = 92 \, \text{mA}$$

In an exemplary embodiment in accordance with the present technology, the power dissipated in the resistor ladder 110 during a 1.5 KV, 100 uS surge is 170 W for the whole resistor network as represented and explained by the equation just below, and is about 19 W for each resistor.

$$P_{\text{surge\_disapated\_max}} = \frac{(V_{surge} + V_{\text{max\_grid}})^2}{R_{dropper}} = \frac{(1500 + 340)^2}{20 * 10^3} = 170 \, W$$

The Zener diode 52 has to dissipate approximately 2 W for 100 uS as represented and explained by the equation just below.

$$P_{\text{zener\_diode\_dissipation}} = V_{zener} * I_{\text{surge\_max}} = 22 * 92 * 10^{-3} = 2W$$

During the negative sinusoidal wave, the diodes 40 and 42, each rated at 1 kV, block the surge voltage. The resistors 14 and 16 divide the surge equally between diodes 40 and 42. Thus, the power supply alone is able to withstand surges up to 1.5 kV during 100 uS. As will be understood by those of ordinary skill in the art from the disclosure herewith, including the illustrations, representative features 140 as shown in FIG. 3 correspond with the voltage regulator portion of the present power supply subject matter more fully illustrated and discussed in conjunction with FIG. 2 herein. Also, as will be understood, the representative output node 200 of FIG. 3 has the same characteristics as achieved at the output node 82, illustrated in FIG. 2.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would in such fashion be readily apparent to one of ordinary skill in the art.

What is claimed is:

1. A self-protected power supply, comprising:
    a resistor dropper portion;
    a half-wave rectifier portion operatively associated with said resistor dropper portion; and a voltage clamp portion;
wherein said resistor dropper portion includes
n series connected groups of resistors, and
n resistors connected in parallel within each of said groups of resistors;
wherein n≧2; and
wherein said half-wave rectifier portion is connected in series between selected of the n series connected groups of resistors.

2. A self-protected power supply as in claim 1, further comprising:
a capacitor portion; and
wherein said capacitor portion is coupled in parallel with said voltage clamp portion.

3. A self-protected power supply as in claim 2, further comprising:
a voltage regulator portion, having an input portion and an output portion; and
wherein said input portion of said voltage regulator portion is coupled to said capacitor portion.

4. A self-protected power supply as in claim 1, wherein said half-wave rectifier portion comprises a pair of diodes connected in series.

5. A self-protected power supply as in claim 4, further comprising:
a pair of series connected resistors for equalization coupled in parallel with said pair of diodes.

6. A self-protected power supply as in claim 1, wherein said n resistors connected in parallel within each of said groups of resistors of said resistor dropper portion comprises surface mount resistors.

7. A self-protected power supply as in claim 1, wherein each of said n resistors within each of said n series connected group of resistors has substantially the same resistive value.

8. A self-protected power supply as in claim 1, wherein said voltage clamp portion includes a Zener diode.

9. A power supply system for providing a self-protected power supply for use with electronic electricity meters, comprising:
a resistor dropper portion comprising a plurality of surface mounted resistive components, said resistor dropper portion having an input thereto associated with an AC mains which in turn is associated with an electronic electricity meter with which said power supply is used;
a half-wave rectifier portion connected in series between portions of the plurality of surface mounted resistive components of said resistor dropper portion for providing a DC voltage output having a relatively lower voltage than the voltage of the associated AC mains; and
a surge protection portion, operatively interposed between the associated AC mains and said resistor dropper portion;
whereby any power surge is relatively distributed over said power supply system to achieve desired levels of protection for the associated electronic electricity meter while a relatively lower voltage DC supply is obtained from a direct connection to a much higher voltage AC mains source without requiring the use of coupling capacitors or transformers, while also providing a general reduction in circuit board surface area requirements thereby resulting in a relatively compact overall construction.

10. A power supply system as in claim 9, further including a voltage regulator portion, operatively interposed between said half-wave rectifier portion and an associated electronic electricity meter.

11. A power supply system as in claim 9, wherein:
said resistor dropper portion comprises n series connected groups of
resistors, and n resistors connected in parallel within each of said groups of
resistors; and
wherein n≧2.

12. A self-protected power supply as in claim 11, wherein each of said n resistors within each of said n series connected group of resistors has substantially the same resistive value.

13. A method for providing a self-protected power supply for use with electronic electricity meters, comprising the steps of:
connecting a first predetermined number of surface mount resistors in parallel with a common input thereto;
connecting a second predetermined number of surface mount resistors in parallel to a common output thereto; and
connecting a half-wave rectifier in series between said first predetermined number of surface mount resistors and said second predetermined number of surface mount resistors,
whereby a relatively higher AC voltage source associated with said common input to said first predetermined number of surface mount resistors may be reduced to a relatively lower voltage DC voltage for supplying the electronics of an electronic electricity meter associated with the self-directed power supply.

14. A method as in claim 13, further comprising the step of:
selecting the number of said first predetermined number of surface mount resistors to be equal to the number of said second predetermined number of surface mount resistors.

15. A method as in claim 13, further comprising the step of:
selecting the resistive value of said first predetermined number of surface mount resistors to be substantially the same resistive value as that of said second predetermined number of surface mount resistors.

16. A method as in claim 14, further comprising the steps of:
operatively connecting a voltage clamp with said second predetermined number of surface mount resistors; and
connecting a storage capacitor in parallel with said voltage clamp.

17. A method as in claim 16, further comprising the step of:
connecting a voltage regulator to said common output associated with second predetermined number of surface mount resistors.

18. A method as in claim 13, wherein said step of connecting a half-wave rectifier in series between said first predetermined number of surface mount resistors and said second predetermined number of surface mount resistors comprises connecting a pair of series connected diodes between said respective first and second predetermined number of surface mount resistors.

19. A method as in claim 18, further comprising the step of connecting a pair of series connected resistors in parallel with said pair of series connected diodes.

20. A method for providing a self-protected power supply for an electronic metrology device, comprising the steps of:

providing a surge protective device configured for connection to a power mains supply with which the electronic metrology device is associated;

connecting a first predetermined number of surface mount resistors in parallel;

connecting a second predetermined number of surface mount resistors in parallel;

connecting a half-wave rectifier in series between said first predetermined number of surface mount resistors and said second predetermined number of surface mount resistors;

operatively interconnecting said first predetermined number of surface mount resistors with said surge protective device; and connecting a voltage regulator configured for connection to an associated electronic metrology device, the electronics of which is to be powered by the self-protected power supply while the electronic metrology device determines measurements based on the power mains supply.

21. A method as in claim 20, further comprising the step of:

selecting the first predetermined number to be equal to the second predetermined number.

22. A method as in claim 21, further comprising the step of:

selecting the resistive values of said surface mount resistors in dependence on selected characteristics of the power mains supply and the electronic metrology device.

23. A method as in claim 20, wherein said step of connecting a half-wave rectifier in series between said first predetermined number of surface mount resistors and said second predetermined number of surface mount resistors comprises connecting comprises connecting a pair of series connected diodes between said respective first and second predetermined number of surface mount resistors.

24. A method as in claim 23, further comprising the step of connecting a pair of series connected resistors in parallel with said pair of series connected diodes.

25. A method as in claim 23, further comprising the steps of:

operatively interconnecting a voltage clamp with said second perdetermined number of surface mount resistors; and connecting a storage capacitor in parallel with said voltage clamp.

* * * * *